(12) United States Patent
Bycroft

(10) Patent No.: US 6,922,137 B1
(45) Date of Patent: Jul. 26, 2005

(54) COLLISION AND THEFT ALERT SYSTEM

(76) Inventor: Susan M. Bycroft, 2124 Bell Cheer Dr., Clearwater, FL (US) 33765

( * ) Notice: Subject to any disclaimer, the term of this patent is extended or adjusted under 35 U.S.C. 154(b) by 24 days.

(21) Appl. No.: 10/630,151

(22) Filed: Jul. 30, 2003

(51) Int. Cl.[7] .................................................. B60Q 1/00
(52) U.S. Cl. ............................ 340/425.5; 340/426.1; 340/426.19; 340/426.22; 340/426.23; 340/426.25; 340/426.27
(58) Field of Search .................... 340/425.5, 425.1, 340/426.19, 426.22, 426.23, 426.25, 426.27

(56) References Cited

U.S. PATENT DOCUMENTS

| | | | | |
|---|---|---|---|---|
| 3,506,956 A | * | 4/1970 | Harris et al. .............. 340/425.5 |
| 5,559,491 A | * | 9/1996 | Stadler .................... 340/426.25 |
| 5,745,030 A | * | 4/1998 | Aaron ..................... 340/426.11 |
| 5,933,081 A | * | 8/1999 | Jones ...................... 340/539.32 |
| 6,452,488 B1 | * | 9/2002 | He et al. .................... 340/468 |
| 2002/0175830 A1 | * | 11/2002 | Hudson ....................... 340/907 |

* cited by examiner

Primary Examiner—Julie Bichngoc Lieu
(74) Attorney, Agent, or Firm—Edward P. Dutkiewicz

(57) ABSTRACT

A collision and theft alert system comprising several components in combination. First provided is a vehicle having a keypad and a power source. A processor is operatively coupled to the power source and to the keypad and is capable of receiving an incoming signal and sending an outgoing signal. The processor can activate an emergency distress call with GPS location. The processor also is operatively coupled to and activates at least one strobe light, which is operatively coupled to the vehicle. The strobe light has a non-deployed state and a deployed state.

8 Claims, 3 Drawing Sheets

FIG 3
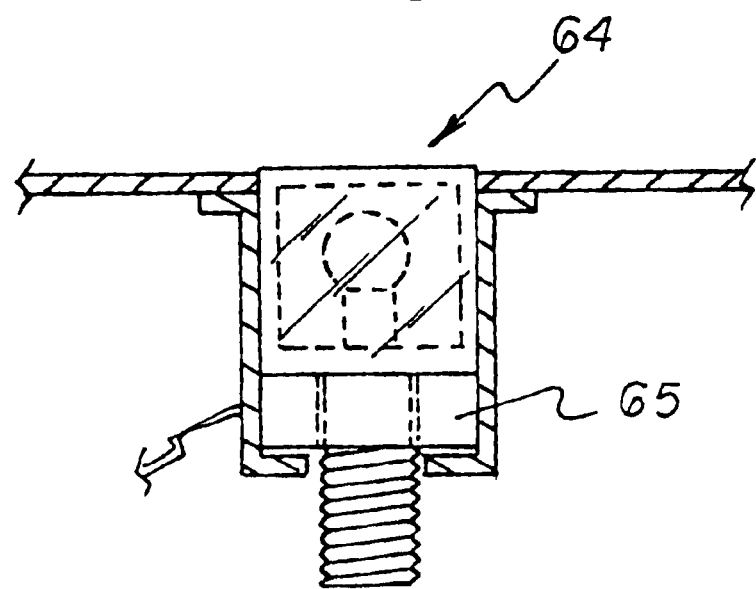
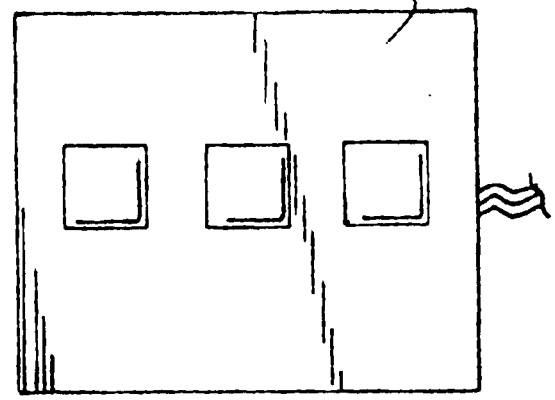
FIG 4

COLLISION AND THEFT ALERT SYSTEM

BACKGROUND OF THE INVENTION

1. Field of the Invention

The present invention relates to a collision and theft alert system and more particularly pertains to allowing a user to safely and efficiently notify occupants in nearby vehicles or structures when an emergency has taken place.

2. Description of the Prior Art

The use of warning systems of known designs and configurations is known in the prior art. More specifically, warning systems of known designs and configurations previously devised and utilized for the purpose of warning users through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,127,844 to Purdy discloses a vehicle strobe warning light system. U.S. Pat. No. 4,103,298 to Redding discloses an alarm device. U.S. Pat. No. 3,641,491 to Bath discloses an automatic anticollision and accident marker system for automobile vehicle. U.S. Pat. No. 3,875,561 to Scarpino discloses a flashing vehicle warning beacon with lens and reflector. U.S. Pat. No. Des. 349,256 to Bellinger discloses an emergency flashing strobe light. U.S. Pat. No. 3,916,377 to Demeter discloses a vehicle safety warning device. Lastly, U.S. Pat. No. 3,022,394 to Clemson discloses an impact-responsive switch.

While these devices fulfill their respective, particular objectives and requirements, the aforementioned patents do not describe a collision and theft alert system that allows allowing a user to safely and efficiently notify occupants in nearby vehicles or structures when an emergency has taken place.

In this respect, the collision and theft alert system according to the present invention substantially departs from the conventional concepts and designs of the prior art, and in doing so provides an apparatus primarily developed for the purpose of allowing a user to safety and efficiently notify occupants in nearby vehicles or structures when an emergency has taken place.

Therefore, it can be appreciated that there exists a containing need for a new and improved collision and theft alert system which can be used for allowing a user to safely and efficiently notify occupants in nearby vehicles or structures when an emergency has taken place. In this regard, the present invention substantially fulfills this need.

SUMMARY OF THE INVENTION

In view of the foregoing disadvantages inherent in the known types of warning systems of known designs and configurations now present in the prior art, the present invention provides an improved collision and theft alert system. As such, the general purpose of the present invention, which will be described subsequently in greater detail, is to provide a new and improved collision and theft alert system and method which has all the advantages of the prior art and none of the disadvantages.

To attain this, the present invention essentially comprises a vehicle. The vehicle has a passenger compartment and an airbag deployment system and a power source. The vehicle has at least one window and a communications system operatively coupled to an existing Global Positioning System, known as GPS. The vehicle also has at least one keypad located in the passenger compartment of the vehicle. The keypad is capable of sending a signal.

In an alternate embodiment the vehicle may have a passenger compartment and a non-passenger compartment, such as a trunk or a truck body. A keypad may also be located in the non-passenger compartment.

Next provided is an airbag sensor. The airbag sensor is operatively coupled to an existing airbag deployment system. The airbag sensor is capable of detecting and sending a signal when the airbag is deployed.

Next provided is a window sensor. The window sensor is operatively coupled to a vehicle window. The window sensor is capable of detecting and sending a signal when the vehicle window is broken. The window sensor may be a shock wave sensor or it may be a wire having a fixed resistance being imbedded into, or affixed to, the glass of the window, so that breakage of the window alters the resistance and institutes an alarm.

Next provided is a processor. The processor is operatively coupled to the airbag sensor, the window sensor, the power source, and to the keypad. The processor is capable of receiving an incoming signal and sending an outgoing signal. The processor receives an incoming signal from the airbag sensor when the airbag is deployed. The processor also receives an incoming signal from the window sensor when the window is broken. The processor also receives an incoming signal from the keypad when a specific emergency code is entered in the keypad.

The processor is also capable of sending an outgoing signal when an incoming signal is received from any sensor. The processor is also capable of sending an outgoing signal to activate the communication system of the vehicle to transmit the GPS location of the vehicle at the time of the processor sending an outgoing signal.

Lastly provided is the system having at least one telescoping, high intensity strobe light. The strobe light has a nesting tube. The strobe light has a non-deployed state in which the strobe is contained within the nesting tube and the light does not flash. The strobe light has a deployment means, such as a spring and latch or an electric motor. The strobe light also has a deployed state in which the strobe protrudes from the nesting tube and the light flashes. The strobe light is operatively coupled to the processor to allow the strobe light to be activated and deployed when the strobe light receives an outgoing signal from the processor.

In an alternate embodiment a strobe light may have a reserve source of power operatively coupled there to. The reserve source of power may be a battery, so as to allow the flashing of the strobe even after the power from the power source is cut or depleted.

In an alternate embodiment there are may be a plurality of strobe lights, with the lights being located on different parts of the car. One light may be located at a high point of the vehicle, such as the roof. Other lights may be located beneath the car, so as to be visible if the car is in the inverted position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collision and theft alert system which has all of the advantages of the prior art warning systems of known designs and configurations and none of the disadvantages.

It is another object of the present invention to provide a new and improved collision and theft alert system which may be easily and efficiently manufactured and marketed.

It is further an object of the present invention to provide a new and improved collision and theft alert system which is of durable and reliable constructions.

An even further object of the present invention is to provide a new and improved collision and theft alert system which is susceptible of a low cost of manufacture with regard to both materials and labor, and which accordingly is then susceptible of low prices of sale to the consuming public, thereby making such collision and theft alert system economically available to the buying public.

Even still another object of the present invention is to provide a collision and theft alert system for allowing a user to safely and efficiently notify occupants in nearby vehicles of structures when an emergency has taken place.

Lastly, it is an object of the present invention to provide a new and improved collision and theft alert system. A collision and theft alert system comprises several components in combination. First provided is a vehicle having a keypad and a power source. A processor is operatively coupled to the power source and to the keypad and is capable of receiving an incoming signal and sending an outgoing signal. The processor can activate an emergency distress call with GPS location. The processor also is operatively coupled to and activates at least one strobe light, which is operatively coupled to the vehicle. The strobe light has a non-deployed state and a deployed state.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged illustration similar to FIG. 2 but with the strobe light in a non-deployed state.

FIG. 4 is an enlarged front view illustrating the keypad shown in FIG. 2.

The same reference numerals refer to the same parts throughout the various Figures.

DESCRIPTION OF THE PREFERRED EMBODIMENT

Figure 1:
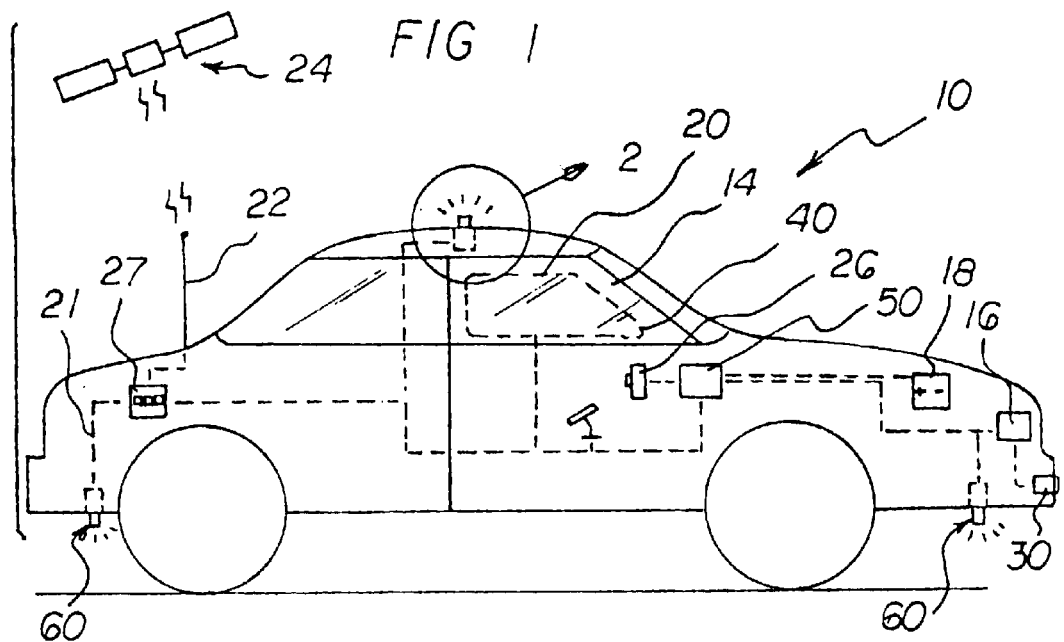
FIG. 1 is a side elevational view of a vehicle equipped with a collision and theft alert system constructed in accordance with the principles of the present invention.
Figure 2:
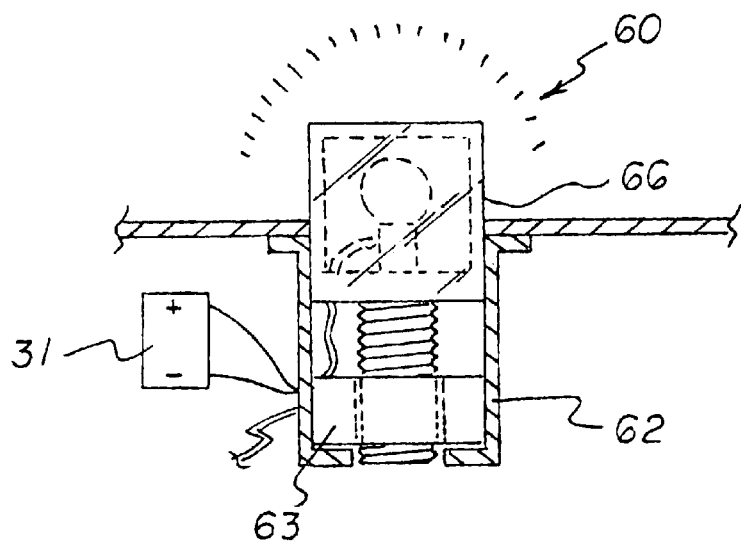
FIG. 2 is an enlarged illustration of the components shown in circle 2 of FIG. 1.
Figure 5:
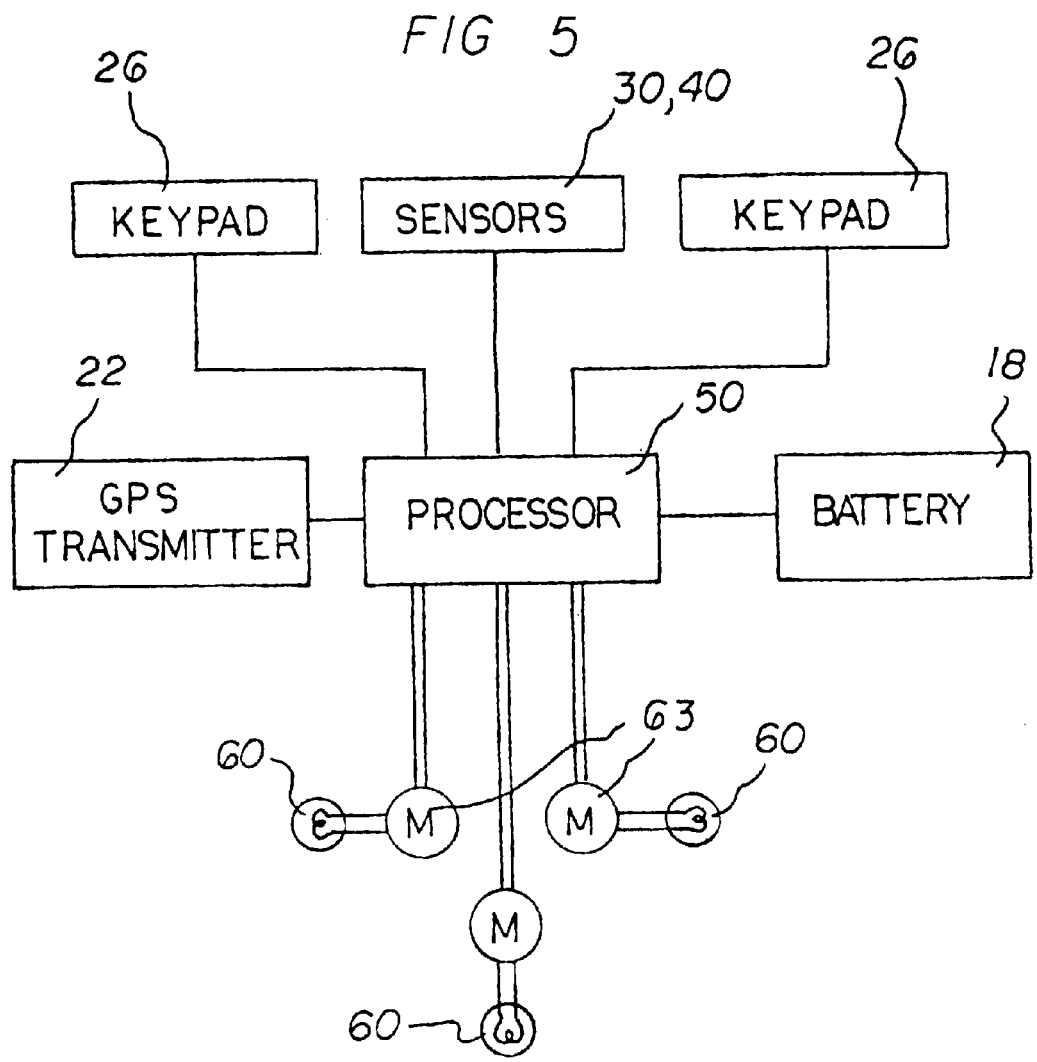
FIG. 5 is an electrical schematic illustration of the electrical components employed in the system of the prior Figures.
Figure 6:
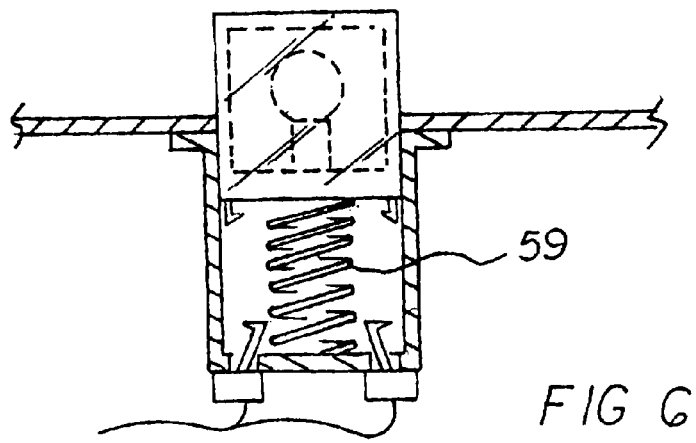
FIG. 6 is an enlarged illustration similar to FIG. 2 but illustrating an alternate embodiment of the invention.

With reference now to the drawings, and in particular to FIG. 1 thereof, the preferred embodiment of the new and improved collision and theft alert system embodying the principles and concepts of the present invention and generally designated by the reference numeral 10 will be described.

The present invention, the collision and theft alert system 10 is comprised of a plurality of components. Such components in their broadest context include a vehicle, a processor, and at least one strobe light. Such components are individually configured and correlated with respect to each other so as to attain the desired objective.

A collision and theft alert system 10 for allowing a user to safely and efficiently notify occupants in nearby vehicles or structures when an emergency has taken place. The system comprises several components in combination.

First provided is a vehicle 12. The vehicle has a passenger compartment 14 and an airbag deployment system 16 and a power source 18. The vehicle has at least one window 20 and a communications system 22 operatively coupled to an existing Global Positioning System 24, known as GPS. The vehicle also has at least one keypad 26 located in the passenger compartment of the vehicle. The keypad is capable of sending a signal.

In an alternate embodiment the vehicle may have a passenger compartment and a non-passenger compartment 21, such as a trunk or a truck body. A keypad 27 may also be located in the non-passenger compartment.

Next provided is an airbag sensor 30. The airbag sensor is operatively coupled to an existing airbag deployment system. The airbag sensor is capable of detecting and sending a signal when the airbag is deployed.

Next provided is a window sensor 40. The window sensor is operatively coupled to a vehicle window. The window sensor is capable of detecting and sending a signal when the vehicle window is broken. The window sensor may be a shock wave sensor or it may be a wire having a fixed resistance being imbedded into, or affixed to, the glass of the window, so that breakage of the window alters the resistance and institutes an alarm.

Next provided is a processor 50. The processor is operatively coupled to the airbag sensor, the window sensor, the power source, and to the keypad. The processor is capable of receiving an incoming signal and sending an outgoing signal. The processor receives an incoming signal from the airbag sensor when the airbag is deployed. The processor also receives an incoming signal from the window sensor when the window is broken. The processor also receives an incoming signal from the keypad when a specific emergency code is entered in the keypad.

The processor is also capable of sending an outgoing signal when an incoming signal is received from any sensor. The processor is also capable of sending an outgoing signal to activate the communication system of the vehicle to transmit the GPS location of the vehicle at the time of the processor sending an outgoing signal.

Lastly provided is the system having at least one telescoping, high intensity strobe light 60. The strobe light has a nesting tube 62. The strobe light has a non-deployed state 64 in which the strobe is contained within the nesting tube and the light does not flash. The strobe light has a deployment means, such as a spring and latch 59 or an electric motor 63. The strobe light also has a deployed state 66 in which the strobe protrubes from the nesting tube and the light flashes. The strobe light is operatively coupled to the processor to allow the strobe light to be activated and deployed when the strobe light receives an outgoing signal from the processor.

In an alternate embodiment a strobe light may have a reserve source of power operatively coupled there to. The reserve source of power may be a battery 31, so as to allow the flashing of the strobe even after the power from the power source is cut or depleted.

In an alternate embodiment there may be a plurality of strobe lights, with the lights being located on different parts of the car. One light may be located at a high point of the vehicle, such as the roof. Other lights may be located beneath the car, so as to be visible if the car is in the inverted position.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable and modifications and equivalents may be resorted to, falling within the scope of the invention.

What is claimed is:

1. A collision and theft alert system for allowing a user to safely and efficiently notify occupants in nearby vehicles or structures when an emergency has taken place comprising, in combination:

a vehicle having a passenger compartment and an airbag deployment system and a power source and at least one window and a communications system coupled to an existing Global Positioning System, known as GPS, the vehicle also having at least one keypad located in the passenger compartment of the vehicle, the keypad being capable of sending a signal;

an airbag sensor being operatively coupled to an existing airbag deployment system, the airbag sensor being capable of detecting and sending a signal when the airbag is deployed;

a window sensor being operatively coupled to a vehicle window, the window sensor being capable of detecting and sending a signal when the vehicle window is broken;

a processor being operatively coupled to the airbag sensor and to the window sensor and to the power source and to the keypad, the processor capable of receiving an incoming signal and sending an outgoing signal, the processor receiving an incoming signal from the airbag sensor when the airbag is deployed, the processor also receiving an incoming signal from the window sensor when the window is broken, the processor also receiving an incoming signal from the keypad when a specific emergency code is entered in the keypad, the processor also being capable of sending an outgoing signal when an incoming signal is received from any sensor, the processor also being capable of sending an outgoing signal to activate the communication system of the vehicle to transmit the GPS location of the vehicle at the time of the processor sending an outgoing signal; and at least one telescoping, high intensity strobe light having a nesting tube, the strobe light having a non-deployed state in which the strobe is contained within the nesting the tube and the light does not flash, the strobe light also having a deployed state in which the strobe protrudes from the nesting tube and the light flashes, the strobe being operatively coupled to the processor to allow the strobe light to be activated and deployed when the strobe light receives an outgoing signal from the processor.

2. A collision and theft alert system comprising, in combination:

a vehicle having a passenger compartment and a power source and at least one keypad being capable of sending a user generated signal and a plurality of emergency sensors, each capable of sending an emergency signal upon the occurrence of an emergency;

a processor being operatively coupled to the power source and to the keypad and to the emergency sensors, the processor capable of receiving an incoming signal and sending an outgoing signal, the processor receiving a user generated incoming signal from the keypad by a user, the processor receiving an emergency generated incoming signal from any of the emergency sensors when an emergency is detected by an emergency sensor when a specific emergency code is entered in the keypad, the processor also being capable of sending an outgoing signal when an incoming signal is received from any sensor; and at least one strobe light, the strobe light having a non-deployed non-emergency withdrawn and encased state and the strobe light having a deployed emergency extended state, with the strobe light flashing in the deployed emergency extended state, the strobe being operatively coupled to the processor for activating the strobe light and the displayed state upon the receipt of any of a plurality of outgoing signals from the processor.

3. A collision and theft alert system as described in claim 2 wherein the system further comprises:

an airbag deployment system in the vehicle;

an airbag sensor being operatively coupled to the airbag deployment system, the airbag sensor being capable of detecting and sending an emergency signal when the airbag is deployed and wherein the processor is operatively coupled to the airbag sensor and to the power source and to the keypad, the processor capable of receiving an incoming emergency signal and sending an outgoing signal, the processor capable of receiving an incoming user generated signal, the processor also being capable of receiving an incoming signal from the airbag sensor when the airbag is deployed, the processor also capable of receiving an incoming signal from the keypad when a specific emergency code is entered in the keypad, the processor also being capable of sending an outgoing signal when an incoming signal is received from any sensor; and wherein the strobe light is coupled to the processor and capable of being activated upon receipt of an outgoing signal from the processor.

4. A collision and theft alert system as described in claim 2 wherein the system further comprises:

the vehicle having at least one window;

a window breakage sensor being operatively coupled to a vehicle window and to the vehicle power source, the window sensor being capable of detecting and sending a signal when the vehicle window is broken;

a processor being operatively coupled to the window sensor and to the power source, the processor capable of receiving an incoming signal and sending an outgoing signal, the processor receiving an incoming signal from the window sensor when the window is broken, the processor also being capable of sending an outgoing signal when an incoming signal is received from any sensor, the processor also being capable of sending an outgoing signal; and at least one strobe light, the strobe being coupled to the processor to allow the strobe light to be activated when the strobe light receives an outgoing signal from the processor.

5. A collision and theft alert system as described in claim 2 wherein the system further comprises:

the vehicle having a communications system being operatively coupled to a Global Positioning System, known as GPS;

a processor being operatively coupled the communications system, the processor capable of receiving an incoming signal and sending an outgoing signal, the processor being capable of sending an outgoing signal to activate the communication system of the vehicle to transmit the GPS location of the vehicle at the time of the processor sending an outgoing signal; and at least strobe light, the strobe light being operatively coupled to the processor to allow the strobe light to be activated upon receiving an outgoing signal from the processor.

6. A collision and theft alert system as described in claim 2 wherein the strobe light is a telescoping, high intensity strobe light having a nesting tube being operatively coupled to the vehicle, the strobe light having a non-deployed state in which the strobe is contained within the nesting tube and the light does not flash, the strobe light also having a deployed state in which the strobe protrudes from the nesting tube and the light flashes, the strobe being operatively coupled to the processor to allow the strobe light to be activated and deployed when the strobe light receives an outgoing signal from the processor.

7. A collision and theft alert system as described in claim 6 wherein there are a plurality of strobe lights being operatively coupled to the vehicle at a plurality of locations.

8. A collision and theft alert system as described in claim 2 wherein the system further comprises:

a vehicle having a passenger compartment and a non-passenger compartment;

a plurality of keypads with at least one keypad, a first keypad being located in the passenger compartment of the vehicle and a second keypad being operatively coupled to the processor, the second keypad being located in the non-passenger compartment of a vehicle.

* * * * *